United States Patent [19]
Stavermann

[11] Patent Number: 5,876,061
[45] Date of Patent: Mar. 2, 1999

[54] KNEE PROTECTION SYSTEM FOR THE FRONT PASSENGER IN A PASSENGER CAR

[75] Inventor: Joerg Stavermann, Munich, Germany

[73] Assignee: Bayerische Motoren Werke Aktiengesellschaft, Munich, Germany

[21] Appl. No.: 13,937

[22] Filed: Jan. 27, 1998

[30] Foreign Application Priority Data

Jan. 30, 1997 [DE] Germany ............... 197 03 430.6

[51] Int. Cl.⁶ .................................................. B60R 21/16
[52] U.S. Cl. ................... 280/732; 280/730.1; 280/752
[58] Field of Search ......................... 280/732, 730.1, 280/752, 753

[56] References Cited

U.S. PATENT DOCUMENTS

| | | | |
|---|---|---|---|
| 3,951,427 | 4/1976 | Wilfert ....................................... | 280/732 |
| 4,427,215 | 1/1984 | Weichenrieder et al. ................ | 280/752 |
| 4,948,168 | 8/1990 | Adomeit et al. .......................... | 280/732 |
| 5,273,310 | 12/1993 | Terai ......................................... | 280/732 |
| 5,344,184 | 9/1994 | Keeler et al. ........................ | 280/732 X |
| 5,385,378 | 1/1995 | Hakamada et al. ...................... | 280/752 |
| 5,775,729 | 7/1998 | Schneider et al. ................... | 280/730.1 |

FOREIGN PATENT DOCUMENTS

| | | |
|---|---|---|
| 0084164A1 | 11/1995 | European Pat. Off. . |
| 2606641C2 | 10/1988 | Germany . |
| 3908713A1 | 10/1989 | Germany . |
| 4003952A1 | 8/1991 | Germany . |
| 4201824 | 8/1992 | Germany ............................... 280/752 |
| 4217173A1 | 11/1993 | Germany . |
| 4227528C1 | 12/1993 | Germany . |
| 19512335A1 | 10/1995 | Germany . |
| 2-197449 | 7/1990 | Japan . |

OTHER PUBLICATIONS

Patent Abstracts of Japan, Mar. 26, 1996, Publication No. 08080797A, Air Bag Device.
Patent Abstracts of Japan, Aug. 6, 1990, 2–197450, Air Bag Arranging Structure for an Automobile.
Patent Abstracts of Japan, 6–80058, Mar. 22, 1994, Air Bag Arranging Structure of an Automobile.

*Primary Examiner*—Christopher P. Ellis
*Attorney, Agent, or Firm*—Evenson, McKeown, Edwards & Lenahan, PLLC

[57] ABSTRACT

Knee protection system for the front passenger in a passenger car, having a glove compartment which is arranged below the dashboard or the cross tube, which is constructed as a hinged compartment and can be swivelled about an approximately horizontal axis and is provided with a latching device in the area of its free edge. Above the hinged compartment, a dimensionally stable hood is arranged which can be swivelled together with the hinged compartment. The hood is provided with a locking element which interacts with the latching device of the hinged compartment. In the area of the free edge, the hood is connected by means of tear-off elements with the dashboard. An air bag module is stationarily arranged above the hood behind the dashboard. A dimensionally stable element is connected with the dashboard and is used as an upper support for the inflated air bag, while the top side of the hood is used as the lower support.

15 Claims, 3 Drawing Sheets

KNEE PROTECTION SYSTEM FOR THE FRONT PASSENGER IN A PASSENGER CAR

BACKGROUND AND SUMMARY OF THE INVENTION

This application claims the priority of German application 197 03 430.6 filed in Germany on Jan. 30, 1997, the disclosure of which is expressly incorporated by reference herein.

The invention relates to a knee protection system for the front passenger in a passenger car, having a glove compartment which is arranged below the dashboard or the cross tube, which is constructed as a hinged compartment and can be swivelled about an approximately horizontal axis and is provided with a latching device in the area of its free edge.

For protecting the chest area and pelvic area of the front passenger in a passenger car, it is known to arrange an air bag module in the dash board which is activated in the case of a sudden acceleration because of an accident. Particularly when the front passenger is not wearing a seat belt, there is, however, the danger of injury to the knee and lower leg area. For reducing this risk, it would be conceivable to arrange an additional air bag module in the glove compartment. However, this would not only reduce the usable space of the glove compartment but would also make the operating of the glove compartment more difficult because of the additional weight of the air bag module. In addition, there is the danger that the swivelling of the glove compartment may damage the electric supply lines of the air bag module so that it will no longer be operative. Another possible measure for protecting the front passenger in the knee and lower leg region would be a special padding of the glove compartment. However, such a padding would considerably impair the freedom of movement of the legs.

It is an object of the invention to provide a knee protection system for the front passenger in a passenger car whose installation is not difficult, requires no valuable space and is distinguished by a high effectiveness while the operatability of the glove compartment is simultaneously maintained.

According to the invention, this object is achieved in that a dimensionally stable hood is arranged above the hinged compartment and can be swivelled together with the hinged compartment, in that an air bag module is stationarily arranged above the hood, in that a dimensionally stable element is connected with the dashboard and/or with the cross tube and acts as an upper support for the inflated air bag while the top side of the hood is used as the lower support, in that the hood is provided with a locking element which interacts with the latching device of the hinged compartment, and in that, in the area of the free edge, the hood is connected by means of tear-off elements with the dashboard or with the dimensionally stable element.

In the normal driving operation, the hood replaces the component which is normally mounted on the dashboard and which is provided with the locking element. This hood, the dimensionally stable element and the air bag module can therefore be installed in an existing vehicle type without any high-expenditure changes. When the air bag module is activated during an impact because of an accident, the air bag is inflated, in which case it is supported on the hood and on the dimensionally stable element. As soon as the predetermined holding force of the tear-off elements has been overcome, the hood together with the hinged compartment will swivel downward about the joint axis, and the air bag can inflate toward the rear into the passenger compartment. In this case, the hinged compartment moves toward the lower legs of the front passenger so that these can be supported early. Since the hinged compartment is locked to the hood and therefore no sharp edges are present, the risk of injury is reduced further. In addition, the content of the glove compartment is secured against falling out.

Other objects, advantages and novel features of the present invention will become apparent from the following detailed description of the invention when considered in conjunction with the accompanying drawings.

DETAILED DESCRIPTION OF THE DRAWINGS

Figure 1:
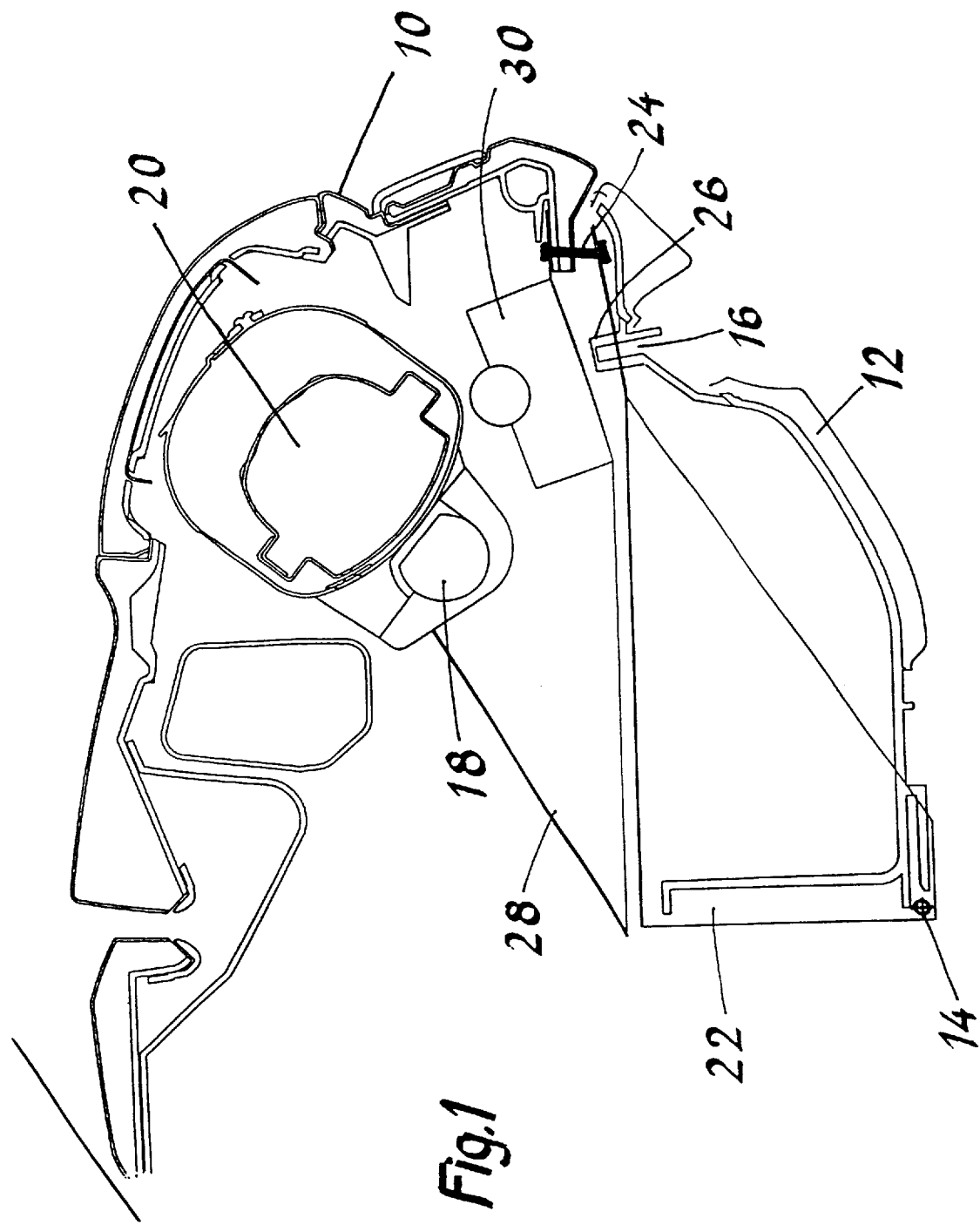
FIG. 1 is a schematic cross-sectional view of a dashboard and glove compartment assembly of a passenger car constructed according to a preferred embodiment of the invention, shown in the normal condition.

As illustrated in FIG. 1, a glove compartment 12 is arranged under a dashboard 10 of a passenger car and can be swivelled in the area of its lower remote end about a vehicle-fixed horizontal axis 14. Because of the swivellable bearing, such a glove compartment is also called "hinged compartment". In the area of its upper free edge, the glove compartment 12 is provided with a latching device 16 by means of which it can be latched with respect to the dashboard 10 in the illustrated normal position. Below the dashboard 10, a cross tube 18 is situated which carries an air bag module 20 for protecting the chest and the pelvic area of a person situated in the (not shown) front passenger seat. The above-described construction of the instrument panel and of the glove compartment in the region of the front passenger is conventional and therefore does not have to be explained in further detail.

Above the glove compartment 12, a dimensionally stable hood 22 is arranged which reaches laterally around it by means of two cheeks 22C. The two cheeks of the hood 22 are rotatably disposed on the vehicle-fixed axis 14. On its free upper edge, the hood 22 is fastened by means of tear-off elements 24 to the dashboard 10. In the drawing, these tear-off elements are illustrated only schematically. They may, for example, be known rotary toggles made of plastic. In the area of its free edge, the hood 22 is provided with a locking element 26 which interacts with the latching device 16 of the glove compartment 12. The latching device 16 may be a rotatable or slidable locking bar which is provided with an undercut, and the locking element 26 may be constructed as a striking plate. However, the construction of the latching device and of the locking element are not essential with respect to the invention. It is only important that the glove compartment 12 cannot, as in the state of the art, be locked directly to the dashboard 10 but to the hood 22 which, in turn, is connected with the dashboard by means of the tear-off elements 24.

Spaced above the hood 22, a dimensionally stable element 28 is arranged in a stationary manner. This dimensionally stable element 26 consists of a bottom with two lateral cheeks which are fastened to the cross tube 18. A knee protection air bag module 30 is inserted into the bottom of the dimensionally stable element 28. This lower air bag module 30 may also be fastened to the cross tube 18. It is only important that the pertaining air bag can inflate into the space bounded by the element 28 and the hood 22.

In a conventional manner, the latching device 16 can be operated for the opening of the glove compartment 12 so that the glove compartment 12 swivels downward about the axis 14 under its own weight with respect to the hood 22 fastened to the dashboard 10.

Figure 2:
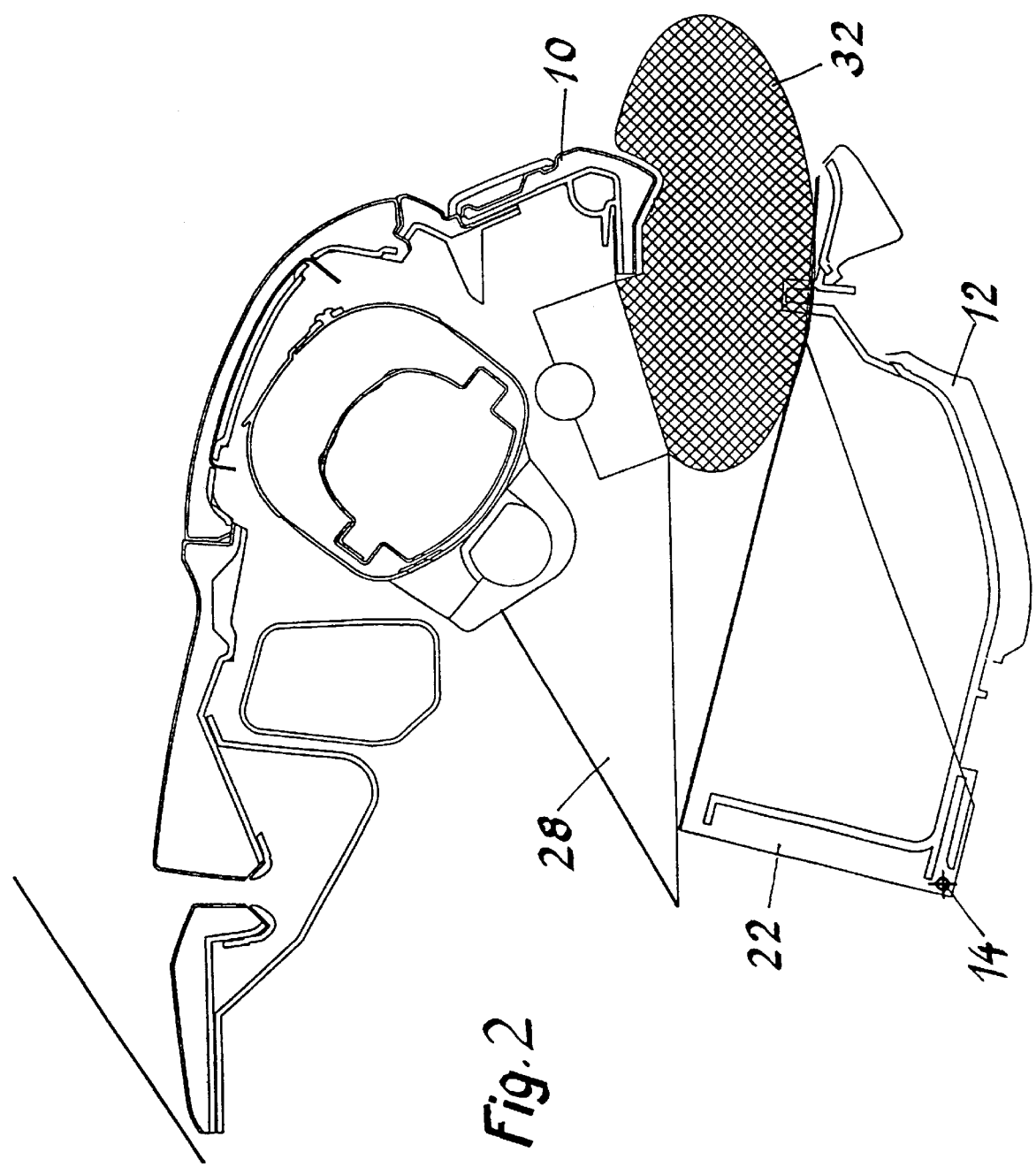
FIG. 2 is a view similar to FIG. 1 shown after activating of an air bag module.
Figure 3:
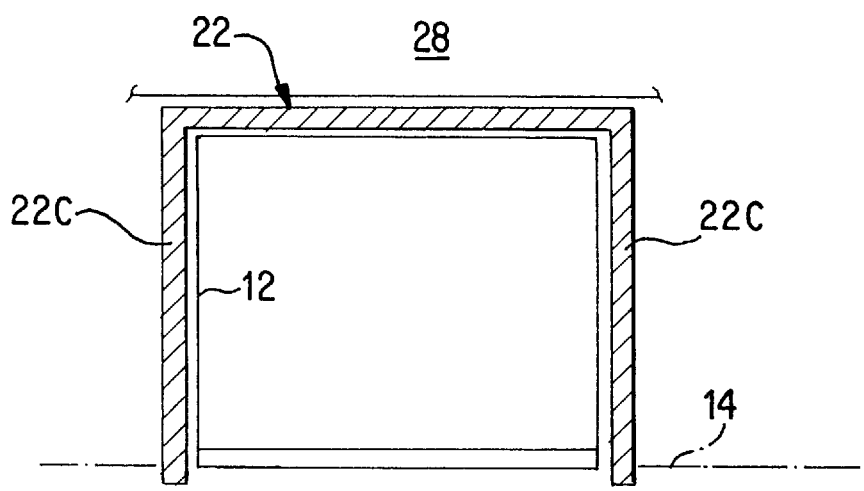
FIG. 3 is a schematic partial view taken along Section line III—III of FIG. 2.

When the knee protection air bag module 30 is triggered during a crash of the motor vehicle, the pertaining air bag is inflated, in which case it is supported on the bottom of the vehicle-fixed element 28 and on the top side of the hood 22. After a certain contact pressure is exceeded, the tear-off elements 24 are destroyed and the hood 22 moves downward together with the glove compartment 12 latched to it. The air bag 32 can therefore inflate farther into the position illustrated in FIG. 2. When the front passenger's lower leg or knee impact on the glove compartment 12, the gas is pressed out of the air bag and the movement of the front passenger is delayed.

A person skilled in the art can recognize that the above-described embodiment which is shown in the drawing can be modified in many ways. It is only important that the glove compartment 12 is locked to the hood 12 and that the hood 22 is detachably connected with the dashboard 10, the dimensionally stable element 28 or with the cross tube 18 so that, when the knee protection air bag module 30 is triggered, the hood 22 is swivelled downward together with the glove compartment 12 with respect to the dashboard 10 and the air bag 32 can be inflated through the resulting forward opening into the passenger compartment. An embodiment is also conceivable in the case of which the chest protection air bag module 20 and the knee protection air bag module 30 are constructed as a constructional unit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Knee protection system for the front passenger in a passenger car, having a glove compartment which is arranged below a dashboard or a cross tube, which is constructed as a hinged compartment and can be swivelled about an approximately horizontal axis and is provided with a latching device in an area of its free edge, wherein a dimensionally stable hood is arranged above the hinged compartment which can be swivelled together with the hinged compartment, wherein an air bag module is stationarily arranged above the hood, wherein a dimensionally stable element is connected with the dashboard and/or with the cross tube and is used as an upper support for the inflated air bag, while the top side of the hood is used as the lower support, wherein the hood is provided with a locking element which interacts with the latching device of the hinged compartment, and wherein the hood is connected in the area of its free edge by means of tear-off elements with the dashboard or with the dimensionally stable element.

2. Knee protection system according to claim 1, wherein the hood, the dimensionally stable element and the air bag module are adapted such to a certain vehicle type that they can be installed as accessories.

3. Knee protection system according to claim 1, wherein the air bag module is fastened to the dimensionally stable element.

4. Knee protection system according to claim 2, wherein the air bag module is fastened to the dimensionally stable element.

5. Knee protection system according to claim 1, wherein the tear-off elements consist of plastic.

6. Knee protection system according to claim 2, wherein the tear-off elements consist of plastic.

7. Knee protection system according to claim 3, wherein the tear-off elements consist of plastic.

8. Knee protection system according to claim 5, wherein the tear-off elements are constructed as rotary toggles.

9. Knee protection system according to claim 6, wherein the tear-off elements are constructed as rotary toggles.

10. Knee protection system according to claim 7, wherein the tear-off elements are constructed as rotary toggles.

11. Knee protection system according to claim 1, wherein said system is adaptable, by means of geometrical adaptations in a region of a steering column penetration for use on a vehicle driver side.

12. Knee protection system according to claim 2, wherein said system is adaptable, by means of geometrical adaptations in a region of a steering column penetration for use on a vehicle driver side.

13. Knee protection system according to claim 3, wherein said system is adaptable, by means of geometrical adaptations in a region of a steering column penetration for use on a vehicle driver side.

14. Knee protection system according to claim 5, wherein said system is adaptable, by means of geometrical adaptations in a region of a steering column penetration for use on a vehicle driver side.

15. Knee protection system for a passenger car passenger sitting behind a dashboard assembly in a car having a hinged compartment swivellable about an axis extending horizontally in front of the car passenger, comprising:

a dimensionally stable hood disposed in use above the hinged compartment and being pivotal about a horizontal axis, a dimensionally stable component disposed to be fixed in position with respect to the dashboard assembly, a knee protection airbag module disposed above the hood and under the stable component, a locking element at the hood interengaged with a latching device of the hinged compartment, and at least one tearoff element holding the hood in position with respect to the dashboard assembly during normal driving conditions and being detachable in response to inflation of a knee airbag of the knee airbag assembly to force downward pivotal movement of the hood to permit movement of the airbag into a knee protection position.

* * * * *